United States Patent
Novikov et al.

(10) Patent No.: US 10,897,578 B2
(45) Date of Patent: Jan. 19, 2021

(54) EXPOSURE RATIO CONTROL

(71) Applicant: Apical Limited, Cambridge (GB)

(72) Inventors: Maxim Novikov, Loughborough (GB); Alexey Kornienko, Loughborough (GB); Alexis Leonardo Lluis Gomez, Castle Donnington (GB)

(73) Assignee: Apical Limited, Cambridge (GB)

( * ) Notice: Subject to any disclaimer, the term of this patent is extended or adjusted under 35 U.S.C. 154(b) by 117 days.

(21) Appl. No.: 16/225,410

(22) Filed: Dec. 19, 2018

(65) Prior Publication Data
US 2019/0191068 A1 Jun. 20, 2019

(30) Foreign Application Priority Data

Dec. 20, 2017 (GB) .................................. 1721498.2

(51) Int. Cl.
| | | |
|---|---|---|
| *H04N 5/235* | (2006.01) | |
| *H04N 5/357* | (2011.01) | |
| *G06K 9/46* | (2006.01) | |
| *H04N 5/361* | (2011.01) | |

(52) U.S. Cl.
CPC ......... *H04N 5/2353* (2013.01); *G06K 9/4642* (2013.01); *H04N 5/2351* (2013.01); *H04N 5/2355* (2013.01); *H04N 5/2356* (2013.01); *H04N 5/357* (2013.01); *H04N 5/361* (2013.01)

(58) Field of Classification Search
CPC .... H04N 5/2353; H04N 5/361; H04N 5/2356; H04N 5/2351; H04N 5/2355; H04N 5/357; H04N 5/35536; G06K 9/4642; G03B 7/00
See application file for complete search history.

(56) References Cited

U.S. PATENT DOCUMENTS

| | | | | |
|---|---|---|---|---|
| 2013/0027589 A1* | 1/2013 | Johansson | .............. | H04N 5/217 348/241 |
| 2014/0205193 A1* | 7/2014 | Umezu | .............. | H04N 5/23264 382/169 |
| 2014/0362282 A1* | 12/2014 | Romanenko | ......... | H04N 5/2355 348/362 |
| 2015/0350512 A1* | 12/2015 | Chen | ........................ | G06T 3/40 348/222.1 |

FOREIGN PATENT DOCUMENTS

| | | |
|---|---|---|
| JP | 2008205935 A1 | 9/2008 |
| WO | 2012173571 A1 | 12/2012 |

OTHER PUBLICATIONS

Combined Search and Examination Report dated Jun. 14, 2018 for Application No. GB1721498.2.
Dr Aleis Lluis Gomez: "Fundamentals of an automotive image signal processor" conference presentation, Sep. 19, 2017.

* cited by examiner

*Primary Examiner* — Nhan T Tran
(74) *Attorney, Agent, or Firm* — EIP US LLP (57) ABSTRACT

A method of determining an exposure ratio for use with a multi-exposure image capture system operable to capture a first image of a scene with a first exposure and a second image of the scene with a second exposure shorter than the first exposure. The exposure ratio is a ratio of the first exposure to the second exposure. The method comprises obtaining image data representative of an image captured using an image sensor of the image capture system and setting the exposure ratio in dependence on a distribution of counts relating to values of a characteristic of respective pixels of the image and a weighting function which varies with the values of the characteristic.

20 Claims, 5 Drawing Sheets

EXPOSURE RATIO CONTROL

CROSS-REFERENCE TO RELATED APPLICATIONS

This application claims priority to GB Application No. 1721498.2, filed Dec. 20, 2017, under 35 U.S.C. § 119(a). Each of the above-referenced patent applications is incorporated by reference in its entirety.

TECHNICAL FIELD

The present invention relates to a method of determining an exposure ratio, an exposure controller and a multi-exposure image capture system.

BACKGROUND

It is known to control the exposure of sensor pixels of an image sensor. In a known system, two images are captured, each with a different exposure. The two images can be combined to obtain a merged image.

SUMMARY

According to a first aspect of the present disclosure there is provided a method of determining an exposure ratio for use with a multi-exposure image capture system operable to capture a first image of a scene with a first exposure and a second image of the scene with a second exposure shorter than the first exposure, the exposure ratio being a ratio of the first exposure to the second exposure, the method comprising: obtaining image data representative of an image captured using an image sensor of the image capture system; and setting the exposure ratio in dependence on a distribution of counts relating to values of a characteristic of respective pixels of the image and a weighting function which varies with the values of the characteristic.

According to second aspect of the present disclosure there is provided an exposure controller for controlling an exposure ratio for use with a multi-exposure image capture system operable to capture a first image of a scene with a first exposure and a second image of the scene with a second exposure shorter than the first exposure, the exposure ratio being a ratio of the first exposure to the second exposure, the exposure controller operable to: obtain image data representative of an image captured using an image sensor of the image capture system; and set the exposure ratio in dependence on a distribution of counts relating to values of a characteristic of respective pixels of the image and a weighting function which varies with the values of the characteristic.

BRIEF DESCRIPTION OF THE DRAWINGS

Further features will become apparent from the following description, given by way of example only, which is made with reference to the accompanying drawings.

DETAILED DESCRIPTION

Details of systems and methods according to examples will become apparent from the following description, with reference to the Figures. In this description, for the purpose of explanation, numerous specific details of certain examples are set forth. Reference in the specification to "an example" or similar language means that a particular feature, structure, or characteristic described in connection with the example is included in at least that one example, but not necessarily in other examples. It should further be noted that certain examples are described schematically with certain features omitted and/or necessarily simplified for ease of explanation and understanding of the concepts underlying the examples.

Figure 1:
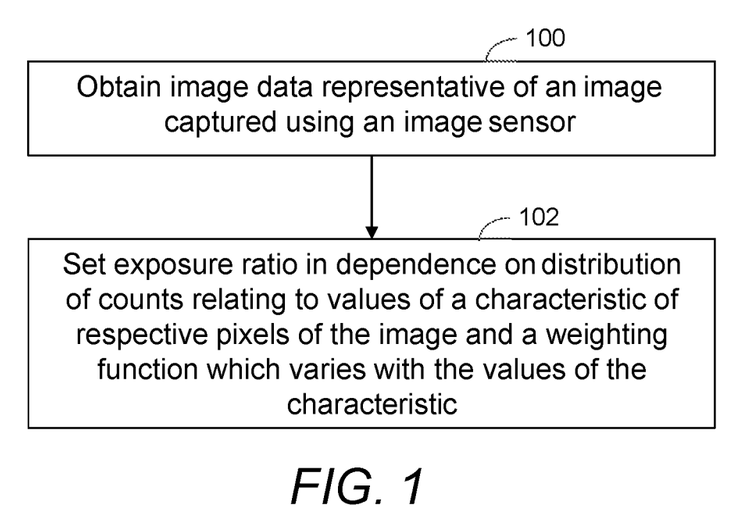
FIG. 1 is a flow diagram showing a method of determining an exposure ratio according to examples.

FIG. 1 is a flow diagram showing a method of determining an exposure ratio according to examples. Methods in accordance with FIG. 1 for example allow the exposure ratio to be determined for use with a multi-exposure image capture system operable to capture a first image of a scene with a first exposure and a second image of the scene with a second exposure shorter than the first exposure. The exposure ratio is for example a ratio of the first exposure to the second exposure.

At block 100 of FIG. 1, image data representative of an image captured using an image sensor of the image capture system is obtained. An image sensor typically includes an array of sensor pixels, which may be any suitable photosensors for capturing images. For example, a typical sensor pixel includes a photosensitive element such as a photodiode that can convert incident light into electronic signals or data. The sensor pixel may for example be a charge-coupled device (CCD) or a complementary metal-oxide-semiconductor (CMOS).

An exposure typically sets the time period over which light is captured by each sensor pixel of the image sensor and/or the gain applied by an amplifier to the electrical signal generated by each sensor pixel. The sensitivity of an image sensor to incident light is therefore generally determined by the exposure. Exposure control is explained further below with reference to FIG. 7.

Referring back to FIG. 1, the image data for example represents at least one characteristic of the light captured by the image sensor. For example, the image data may include intensity data representative of an intensity of the light captured by each sensor pixel, which may be proportional to the number of photons captured by that sensor pixel. The intensity data may represent a luminance of the captured light, which is for example a measure of the intensity of light per unit area rather than an absolute intensity. In other examples, the image data may be representative of a brightness of captured light, which may be considered to correspond to a perception of a luminance, which may or may not be proportional to the luminance. In general, the image data may represent any photometric quantity or characteristic that may be used to represent the visual appearance of the image represented by the image data. The image data may be in any suitable format, such as a raw image format. For example, the image data may be streamed from the image sensor, with or without being saved to a framebuffer, without saving the raw image data to a file. In such cases, image data obtained after processing of the raw image data may, however, be saved to a file.

At block 102 of FIG. 1, the exposure ratio is set in dependence on a distribution of counts relating to values of a characteristic of respective pixels of the image and a weighting function which varies with the values of the characteristic. As described above with reference to the image data, the characteristic may be any characteristic of the image, such as a photometric quantity such as intensity, luminance or brightness, which is indicative of a visual appearance of the image. Typically, the distribution of counts varies based on the content of the scene captured in the image, such as the contrast within the scene or movement of elements of the scene. The distribution may also vary depending on the environment in which the image was captured, such as the brightness of the environment.

In examples in which the characteristic is a pixel intensity of respective pixels of the image, the distribution is a pixel intensity distribution of the pixels of the image. The distribution may for example be represented as a histogram with a plurality of bins, with each bin corresponding to a different respective intensity range. The value associated with each bin corresponds to the number of pixels in the image with a pixel intensity value that lies within the intensity range associated with that respective bin. If the scene is a bright scene, or is captured in a light environment, the distribution will typically have a relatively long tail, to a relatively high intensity value. A mean value of the distribution may also be relatively high. Conversely, if the scene is a dark scene, the distribution may be concentrated in a lower intensity range, or may have a shorter tail or a lower mean value than for light scenes. This is explained further below with reference to FIG. 3.

An image sensor is typically capable of detecting light within a limited range of intensities, which for example may correspond to a limited range of brightnesses. This range may be considered to correspond to the dynamic range of the image sensor, which may be referred to as an exposure range. Intensity values which are beyond the maximum intensity that the image sensor can detect will be set to the same maximum value. This is sometimes referred to as clipping. Similarly, intensity values that are darker than the minimum intensity that the image sensor can detect will be set to the same minimum value. The intensity range that a given image sensor can detect can be altered by altering the exposure of the image sensor. In general, increasing the exposure of the image sensor increases the amount of detail that can be captured in dark parts of the scene. However, this tends to increase the number of pixels of the image that exceed the maximum intensity, reducing the detail captured in bright parts of the scene. In contrast, images captured using a short exposure typically include detail in bright parts of a scene, which may be saturated or over-exposed if captured using a long exposure time.

To increase the dynamic range of an image, such as the ratio in pixel intensities between the brightest and darkest pixels within that image, images captured using various different exposures can be combined. For example, an image of a scene captured using a short exposure can be combined with an image of the scene captured using a long exposure. The image captured using the short exposure will typically include detail in the bright parts of the scene, whereas the image captured using the long exposure will typically include detail in the dark parts of the scene. Thus, by combining the short and long exposure images, the overall detail of the scene in the image can be enhanced, improving the image quality. Combining images of different exposures in this way may be referred to as exposure fusion or exposure stitching.

In methods in accordance with FIG. 1, the exposure ratio is set in dependence on the distribution of counts relating to the values of the characteristic of respective pixels of the image, for example in dependence on a pixel intensity distribution of the pixels. In this way, the exposure ratio may be selected appropriately to provide a desired image quality. For example, the exposure ratio may be set such that an increase in counts in a relatively low range of values of the characteristic increases the exposure ratio. In other words, the exposure ratio may be increased for scenes that are relatively dark or that include a relatively large quantity of dark pixels or decreased for scenes that are relatively light or that include a relatively large quantity of light pixels. By increasing the exposure ratio, a first exposure for capturing a first image may be increased relative to a second exposure for capturing a second image, where the second exposure is shorter than the first exposure, allowing more light to be captured for the dark parts of the scene, enhancing details in these parts of the scene. The first and second images may then be combined.

In examples in accordance with FIG. 1, the exposure ratio is also set in dependence on a weighting function which varies with the values of the characteristic. The weighting function may for example be sensitive to or dependent on a sensor noise associated with the image sensor, which may depend on the characteristic, which, as noted above, may be a photometric characteristic such as a pixel intensity of respective pixels of the image. For example, the weighting function may be any suitable function to model a behaviour of the image sensor that reduces or interferes with a signal captured by the image sensor.

Thus, in methods described herein, the exposure ratio can be set in dependence on the distribution and the weighting function, for example to enhance a signal corresponding to the actual scene compared to a noise or other unwanted fluctuation that is not representative of the scene. This may enhance the image quality of images captured by the multi-exposure image capture system.

Figure 2:
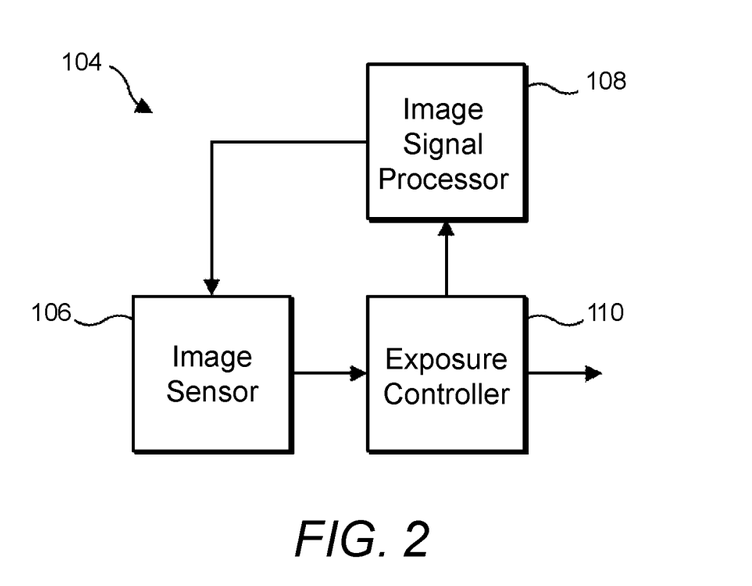
FIG. 2 shows schematically a multi-exposure image capture system according to examples.
Figure 3:
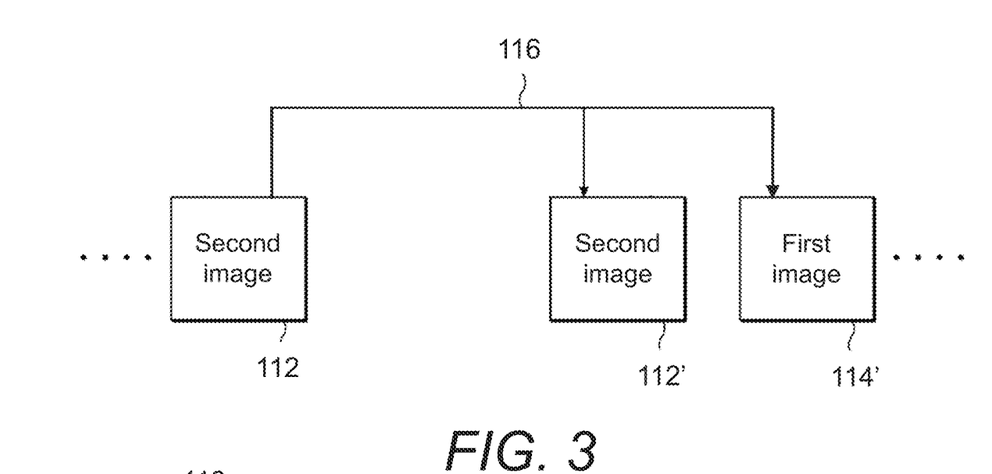
FIG. 3 shows an example of time sequences of captured images.

FIG. 2 shows schematically a multi-exposure image capture system 104 for capturing images according to examples. The multi-exposure image capture system 104 of FIG. 2 has been simplified for ease of explanation, but is illustrated in more detail in FIG. 7 (described below). The multi-exposure image capture system 104 is for example an image capture system that is operable to capture images with a plurality of different exposures, which may be used to obtain an image with a high dynamic range, such as a dynamic range exceeding 80 decibels (dB). The system 104 of FIG. 2 can be used to capture two or more images that may have different exposures, which can be merged into a single image. The dynamic range of the captured images is usually smaller than the dynamic range of the merged image. The different exposures of the two or more images may be realised by different time periods over which light is captured by each sensor pixel and/or a gain applied by an amplifier to the signal output by a sensor pixel. Hence, a low/high exposure has a short/long time period and/or a low/high amplification. The different time periods for capturing the images may be successive in time or partially or completely overlapping. For example, the multi-exposure image capture system 104 may include a plurality of different sets of image sensor pixels, each configured to capture an image with a different respective exposure. Alternatively or additionally, the multi-exposure image capture system

104 may include adjustable exposure image sensor pixels, for which an exposure can be adjusted or controlled so as to capture images with different exposures. Different schemes for capturing images with different exposures are discussed further below with reference to FIG. 3.

A multi-exposure image capture system such as that of FIG. 2 may for example be or include a mobile phone or smartphone camera, a standalone digital camera, a digital camera coupled to or incorporated in a further electronic device, or a computer.

The multi-exposure image capture system 104 of FIG. 2 includes an image sensor 106, as well as an image signal processor 108 and an exposure controller 110, which are discussed further below with reference to FIG. 7. The image signal processor 108 and the exposure controller 110 may be integrated in one processor. An image of a scene is captured by the image sensor 106. The captured image is transferred to the image signal processor 108 as an array of pixel intensities, for example. The exposure controller 110 obtains data from the image signal processor 108 relating to values of pixels of the image, usually pixel intensities, determines an exposure ratio from this data and transmits the exposure ratio to the image sensor 106 to set the exposure ratio of the image sensor 106 to a value appropriate for the scene captured by the image sensor 106.

In examples described below with reference to FIG. 3, a first image and a second image are captured sequentially in time. The first image may be captured before the second image or vice versa. Alternatively, the first and second image may be captured within a single frame by means of alternating the exposure between each line or pair of lines of sensor pixels to produce two images each of half the vertical resolution. In yet further examples, the image capture system may use some sensor pixels to capture the first image and other sensor pixels to capture the second image. In such examples, the first and second image may be captured simultaneously or substantially simultaneously. For example, the time during which the first and second images are captured may overlap each other. The first image (captured with a first exposure which is longer exposure than the second exposure) typically has a good contrast in the shadows of the scene, whereas the second image (captured with a second exposure which is shorter than the first exposure) typically has a good contrast in the highlights of the scene. The first and second images in FIG. 3 are merged into one image. For example, a weight may be applied to each pixel of the first and second images. The weight is typically based on characteristics of the pixel, such as the contrast, saturation and luminosity of the pixel. The weights may also depend on a desired appearance of the merged image. This allows the appearance of the merged image to be tailored according to an intended use of the merged image or according to a user preference. A determination as to whether each pixel is to be included in the merged image may be made based on the weight associated with that respective pixel. Alternatively, the contribution of pixels corresponding to the same pixel location but in the first and second images, may depend on the associated weights. In other words, each pixel of the first and second images may contribute to the merged image but by an amount which depends on the weight associated with the respective pixel. A series of merged images may be obtained by combining first and second images in a series of pairs of frames to form a video stream.

FIG. 3 shows a time sequence of second images 112, 112' and a first image 114', captured by an image sensor such as the image sensor 106 of FIG. 2. The second images 112, 112' and the first image 114' are for example of the same scene. For example, the image sensor used to capture these images may be relatively static or still during the capture of these images or there may be a relatively small amount of relative movement between elements of the scene and the image sensor. The second images 112, 112' are captured using a second exposure, which is shorter than the first exposure used to capture the first image 114'. The second image 112 is captured at a first time and the second image 112' and the first image 114' are captured at a second time after the first time. For example, the second image 112 may correspond to a first frame and the second image 112' and the first image 114' may correspond to a second frame subsequent to the first frame in examples in which the image sensor is used to capture a video stream. The second frame is for example directly subsequent to the first frame, for example with the second frame immediately following the first frame. Alternatively, there may be one or more intermediate frames between the first frame and the second frame. The distribution of counts relating to values of a characteristic of respective values of respective pixels of the second image 112, in conjunction with the weighting function which varies with the values of the characteristic, is used to determine the exposure ratio for the first image 114' and for the second image 112' obtained subsequently, as indicated by the line 116 in FIG. 3. In other examples, though, data obtained from an image different from the first and second image may be used to derive the exposure ratio. For example, the distribution of counts may be a distribution for counts for an image different from the first and second image, such as an image captured using a different exposure. For example, there may be a dedicated image sensor or dedicated sensor pixels of the image sensor that are used primarily or solely for capturing images for the determination of the exposure ratio. In such cases, the distribution of counts may be derived using these images.

Figure 4A:
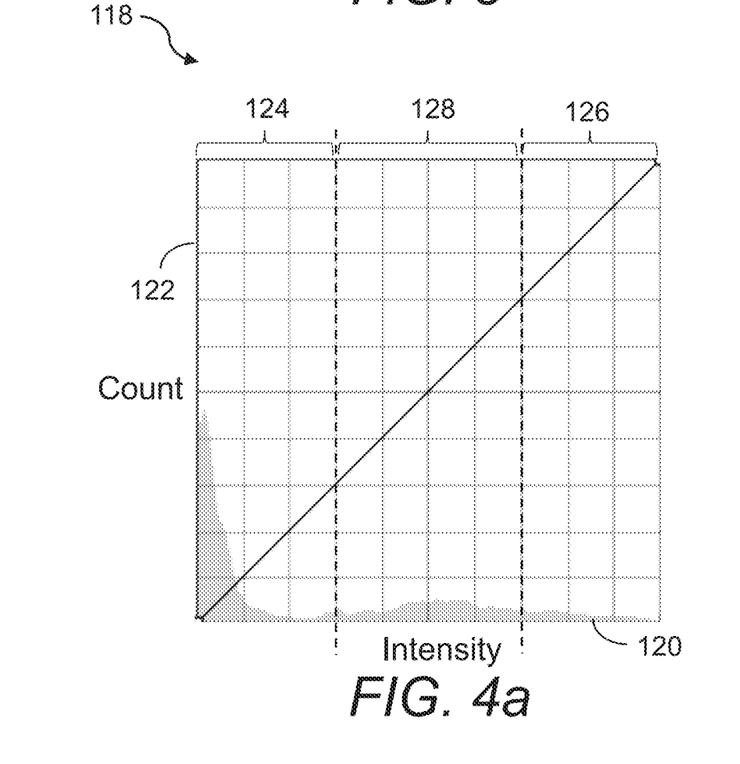
FIGS. 4a and 4b illustrate examples of pixel intensity histograms.
Figure 4B:
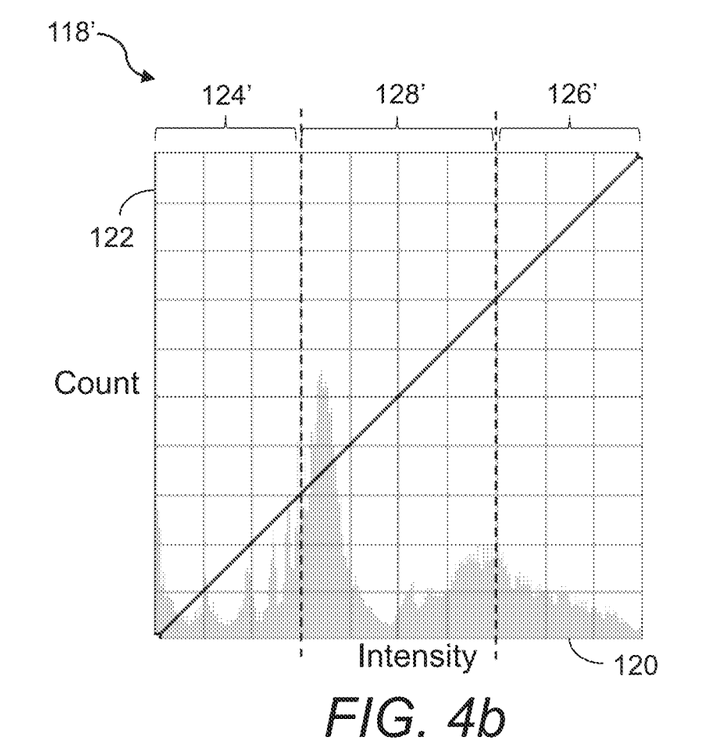

FIGS. 4a and 4b illustrate examples of pixel intensity histograms 118, 118'. A pixel intensity distribution, for example stored in a histogram such as those of FIGS. 4a and 4b, is an example of a distribution of counts relating to values of a characteristic of respective pixels of an image, which may be used for the setting of an exposure ratio.

The pixel intensity histogram 118 of FIG. 4a is for a scene with both dark and bright elements, such as an outside scene on a sunny day, with both highlights and deep shadows. In contrast, the pixel intensity histogram 118' of FIG. 4b is for a scene with a generally smaller range of different brightnesses, such as an indoor scene, for example in a studio, or an outdoor scene on a cloudy day. As can be seen from a comparison of FIGS. 4a and 4b, the shape of the pixel intensity distribution is noticeably different for these two different scenes.

In FIGS. 4a and 4b, the x-axis 120 corresponds to a pixel intensity, which increases from left to right in the Figures. The x-axis 120 of FIGS. 4a and 4b is on a linear scale. The y-axis 122 corresponds to a count. Thus, the count of each bin of the histograms 118, 118' of FIGS. 4a and 4b represents the number of pixels of an image that have a pixel intensity within a range corresponding to the respective bin.

The distributions shown in the histograms 118, 118' of FIGS. 4a and 4b may be divided into a plurality of regions, in this example a first, second and third region (labelled 124, 126, 128 in FIGS. 4a and 124', 126', 128' in FIG. 4b), as in this example the multi-exposure image capture system for which the exposure ratio is to be determined is operable to capture images with three different exposures. Other examples may have more or fewer regions, though. Typically the histogram may be divided into a number of regions which equals the number of different exposures the multi-exposure image capture system is configured to capture, although in some cases the histogram may be divided into more or fewer regions than this. Each region is associated with a different respective range of values of a characteristic of pixels of an image, in this example a different range of pixel intensity values. The first region 124, 124' in these examples corresponds to a lowest intensity range. The third region 128, 128' corresponds to an intermediate intensity range. The second region 126, 126' corresponds to a highest intensity range. The number of counts in each of the first, second and third regions differs between the pixel intensity histograms 118, 118' of FIGS. 4a and 4b. In FIG. 4a, the majority of counts are located in the first region 124, and the second and third regions 126, 128 each contain relatively few counts. Conversely, in FIG. 4b, the majority of counts are located in the third region 124' and the first and second regions 124', 126' are relatively sparsely populated compared to the third region 124'.

In order to appropriately capture detail of the scenes corresponding to the images used to derive the histograms 118, 118' of FIGS. 4a and 4b, the exposure ratio may be controlled for example using the method of FIG. 1. For example, to capture, in one image, the scene corresponding to the histogram 118 of FIG. 4a, with a larger number of counts in the first region 124 corresponding to a lowest intensity range, increasing the exposure to capture detail in the first region 124 may for example cause clipping of the bright parts of the image (in the third region 126) due to overexposure. Conversely, increasing the exposure to capture the scene corresponding to the histogram 118' of FIG. 4b in one image, with the same number of clipped pixels as a scene corresponding to the histogram 118 of FIG. 4a with increased exposure, will lead to an intensity distribution that is higher in intensity, and therefore brighter. The scene corresponding to the histogram 118' of FIG. 4b may therefore be higher quality than that corresponding to the histogram 118 of FIG. 4a upon an increase in exposure. However, by capturing the scenes corresponding to these scenes using two or more images with different exposures, the image quality may be improved. For example, an exposure ratio to capture the scene corresponding to the histogram 118 of FIG. 4a may be higher than an exposure ratio to capture the scene corresponding to the histogram 118' of FIG. 4b, to capture the detail in the shadows of the histogram 118 of FIG. 4a without suffering from excessive clipping in the highlights.

In addition to the pixel intensity distribution (or distribution of another characteristic of pixels of an image), the quality of the image obtainable with the image capture system typically also depends on the noise associated with an image sensor of the image capture system or on other factors that cause unwanted or unrepresentative fluctuations that do not relate to the scene being captured. To further improve the image quality, the method in examples involves setting the exposure ratio in dependence on a weighting function which varies with the values of the characteristic in addition to the distribution of counts relating to values of the characteristic of respective pixels of the image. For example, the weighting function may be a continuous function, which varies continuously in dependence on the values of the characteristic. In such cases, the weighting function may vary across all, or at least part, of the distribution of counts. In this way, the weighting function may accurately represent noise or other factors that are not representative of the actual scene to be captured.

Figure 5:
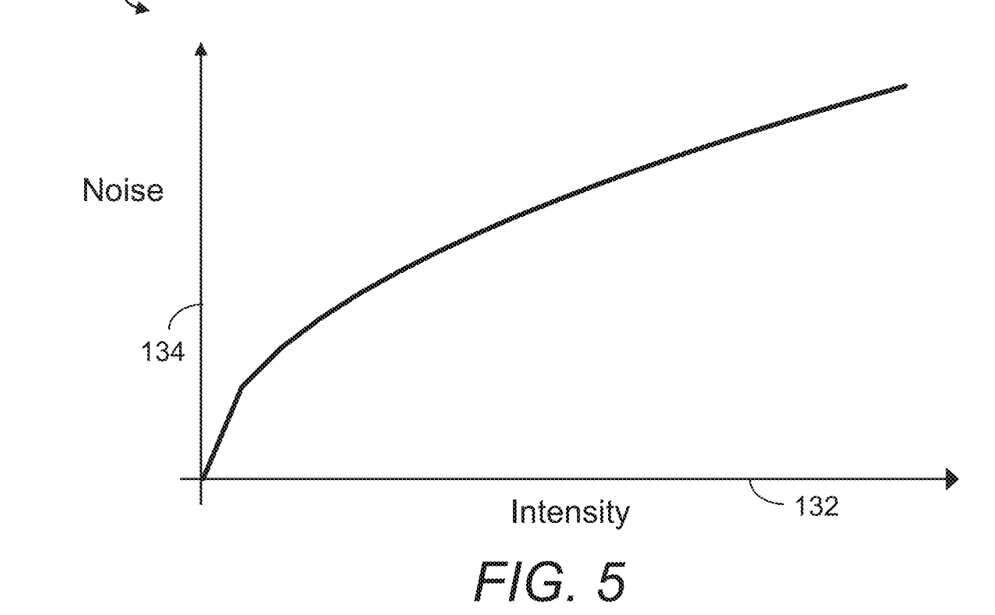
FIG. 5 illustrates an example of a graph of a weighting function for use in determining an exposure ratio.

FIG. 5 illustrates an example of a graph 130 of a weighting function for use in determining an exposure ratio. In FIG. 5, the x-axis 132 corresponds to a pixel intensity, which increases from the left to the right of the Figure, and the y-axis 134 corresponds to a value of the weighting function for a corresponding pixel intensity value, which increases from the bottom to the top of the Figure. In examples such as this, the weighting function corresponds to a noise profile of an image sensor with which an image is captured. Thus, in FIG. 5, the y-axis 134 corresponds to a noise value for a corresponding pixel intensity value. A weighting function may be considered to correspond to a noise profile for example where a value of the weighting function is close to or similar to a noise value for a given value of the characteristic, for example within 20%, 10%, 5%, 2% or less. For example, a graph of the weighting function may have a shape that corresponds to or is similar to a shape of the noise profile. For example, the shape of the graph of the weighting function and the shape of the noise profile may differ by less than 20%, 10%, 5% or 2%. The exact value of the weighting function and the noise value for a given value of the characteristic may not be the same. For example, a graph of the weighting function may be offset compared to the noise profile, for example with a constant offset. Nevertheless, the variation of the weighting function in dependence on the values of the characteristic may capture a variation of the noise of the image sensor in examples in which the weighting function generally corresponds to the noise profile of the image sensor.

The noise profile may include contributions from various different sources, such as Gaussian noise, for example due to thermal noise arising from electronic components of the image sensor or amplifier noise, and which is typically independent of a characteristic of the pixels. Other noise sources include salt-and-pepper noise (sometimes referred to as spike noise), for example due to errors in transmission or in analog-to-digital conversions, in which bright image regions include dark pixels or dark image regions include light pixels. A further noise source is shot noise, which may be the dominant source of noise in dark parts of an image. Shot noise may be caused by statistical fluctuations in the number of photons sensed by an image sensor at a given exposure. Shot noise may be modelled using a Poisson distribution and typically depends on the characteristic of the pixels, such as the pixel intensity.

In examples such as that of FIG. 5, the noise of the image sensor is dominated by shot noise. Hence, in this example, the weighting function is generally proportional to a square root of the value of the characteristic, which in this example is pixel intensity (as shot noise typically varies as the square root of the pixel intensity). A weighting function may be considered to be generally proportional to the square root of the value of the characteristic for example where a variation of the weighting function for varying values of the characteristic has a shape which is approximately the same as the output of a square root function, with the values of the characteristic as an input. For example, the shape of the weighting function and the output of such a square root function may differ by less than 20%, 10%, 5% or 2%. In examples, the weighting function may be generally proportional to the square root of the value of the characteristic where the weighting function varies as the square root of the value of the characteristic plus a constant.

For example, the noise profile, σ(x), of an image sensor may be modelled as:

$$\sigma(x) = \sqrt{b^2 + cx} \qquad (1)$$

where x is a pixel intensity value and b and c are constants that may be determined empirically.

The noise profile in cases such as this may be approximated as:

$$\sigma(x) \approx \sqrt{cx} \quad (2)$$

for example where the contribution independent of pixel intensity is small relative to the contribution that depends on the pixel intensity, in other words where $b^2 \ll cx$. This may be the case for typical image sensors.

In examples such as FIG. 5, the exposure ratio can be determined using the weighting function that generally corresponds to the noise profile of the image sensor and the distribution of counts relating to values of the characteristic of respective pixels of the image. For example, distribution data derived from the distribution of counts can be input to an optimization function based on the function. An output value of the optimization function is typically dependent on an input exposure ratio which is input to the optimization function. The exposure ratio may then be set in dependence on the output value.

For example, the exposure ratio may be derived using an iterative process. An iterative process may involve inputting a plurality of input exposure ratios to the optimization function, obtaining a plurality of output values corresponding to a respective one of the plurality of input exposure ratios and selecting the exposure ratio from the plurality of input exposure ratios based on the plurality of output values of the optimization function. The exposure ratio that corresponds to an optimum output value of the plurality of the plurality of output values may be selected for example to select the exposure ratio that optimizes the optimization function. The optimum output value may for example be the largest output value, for example for which the value of the optimization function is greatest, although in other examples the optimum output value may be a value of the optimization function that satisfies some other criterion.

The optimization function may include a signal to noise ratio (SNR) function or a weighted signal to noise ratio (WSNR) function. For example, given the distribution of counts relating to values of the characteristic of respective pixels of the image, which may be in the form of a histogram, and a noise profile, $\sigma(x)$, which may also be referred to as a noise model, a signal to noise ratio, SNR, can be calculated as:

$$SNR = \frac{x}{\sigma(x)} \quad (3)$$

The noise profile may be as described above, or different, and x is the value of the characteristic of pixels of the image, such as the pixel intensity value.

The SNR can be expressed in decibels using a logarithmic scale. In such cases, the SNR can be calculated as:

$$SNR = 10 \log_{10} \left( \frac{x}{\sigma(x)} \right) \quad (4)$$

However, typically, the logarithm may be omitted as it is monotonously increasing.

A WSNR value may be obtained from a WSNR function, which typically corresponds to the SNR function weighted by respective counts from the distribution of counts relating to values of the characteristic of the pixels of the image. For example, where this distribution of counts is stored as a histogram, H(x), the WSNR can be calculated as:

$$WSNR = \sum_{x=0}^{N} \frac{xH(x)}{\sigma(x)} \quad (5)$$

where N is the number of pixels in the image represented by the histogram, H(x).

As for the SNR, the WSNR may also be expressed in decibels using a logarithmic scale. For example, the WSNR function may include a logarithmic function, such as a logarithmic function of the SNR. In such cases, the WSNR can be calculated as:

$$WSNR = \sum_{x=0}^{N} \left( W(H(x)) * 10 \log_{10} \left( \frac{x}{\sigma(x)} \right) \right) \quad (6)$$

where W represents a weighting function that may be applied to the histogram bin values, which may be determined empirically for example. The weighting function may in some cases be omitted, though.

In examples in which the noise profile is as given in equation (2) above, the noise profile may be substituted in to equation (6) to give the following expression for the WSNR:

$$WSNR = \sum_{x=0}^{N} \frac{xH(x)}{\sqrt{cx}} = \sum_{x=0}^{N} H(x)\sqrt{x/c} \quad (7)$$

In general, the SNR or the WSNR varies in dependence on the exposure of a given image sensor with a given noise profile. Typically, the SNR or the WSNR for a given pixel intensity value is larger for a longer exposure, up to a certain pixel intensity value at which the intensity is clipped due to exceeding the maximum intensity value detectable by the image sensor. At pixel intensity values beyond this point, the SNR and WSNR are also restricted, and no further detail can typically be obtained in this intensity range.

For a typical image sensor, a linear increase in signal (for example representative of a scene captured as an image) corresponds to a square root increase in noise rather than a linear increase in noise. This allows the SNR or WSNR can be increased, for example by varying the exposure for capturing images used to generate a merged image, e.g. by varying an exposure ratio between a first exposure and a second exposure as described above. In examples described herein, the optimization function based on the weighting function (to which the distribution data derived from the distribution of counts may be input) may therefore include a SNR or WSNR function.

Figure 6A:
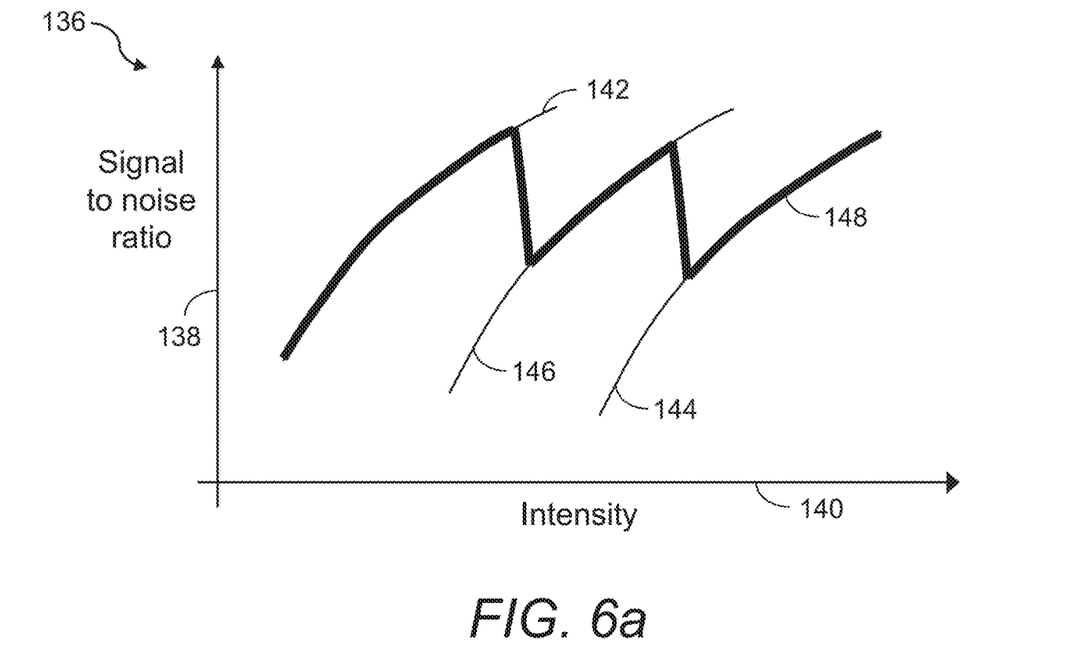
FIGS. 6a and 6b illustrate examples of a signal to noise ratio for different exposure ratios.

The dependence of the SNR on the exposure can be seen in FIG. 6a, which illustrates a graph 136 of SNR (on the x-axis 138) against pixel intensity (on the y-axis 140) for an image sensor with a first exposure 142, a second exposure 144 and a third exposure 146. In this example, the second exposure 144 is longer than the first exposure 142 and the third exposure 146 and the third exposure 146 has a length in between that of the first exposure 142 and the second exposure 144. In other words, the second exposure 144 may be considered to be a long exposure, the third exposure 146 may be considered to be an intermediate exposure and the first exposure 142 may be considered to be a short exposure. The exposure ratio, which is for example the ratio between a long and a short exposure, may therefore be taken as the ratio between the first exposure 142 and the second exposure 144. In the graph 136 of FIG. 6a, both the x-axis 138 and the y-axis 140 use a logarithmic scale (sometimes referred to as a decibel scale), for ease of illustration.

As can be seen in FIG. 6a, for a given pixel intensity value, the corresponding SNR value is larger for the first exposure 142 than for the third exposure 146, which is shorter than the first exposure 142. Similarly, the SNR value for a given pixel intensity value is larger for the third exposure 146 than for the second exposure 144, which is shorter than the third exposure 146.

Hence, if an image is created by combining pixel intensity values obtained using different exposures, there may be a discontinuity in SNR. The pixel intensity values of a merged image obtained using exposure fusion are labelled with a thick line 148 in FIG. 6a. For example, the merged image may include pixels from the first image captured with the first exposure 142 for pixels with an intensity within a first region (such as the first region 124, 124' of FIGS. 4a and 4b), pixels from the second image captured with the second exposure 144 for pixels with an intensity within a second region (such as the second region 126, 126' of FIGS. 4a and 4b) and pixels from the third image captured with the third exposure 146 for pixels with an intensity within a third region (such as the third region 128, 128' of FIGS. 4a and 4b). As can be seen from FIG. 6a, the thick line 148 shows sharp decreases in SNR as there is a change in which image the pixels are taken from. This may therefore give rise to stitching artifacts in transition regions between pixels corresponding to dark image regions (which may be captured using a long exposure) and pixels corresponding to lighter image regions (which may be captured using a shorter exposure). Stitching artifacts such as this may be visible in the merged image, for example as noise or unsightly variations in pixel intensity values in these transition regions.

However, changing the exposure ratio, such as the ratio of the first exposure to the second exposure, can change the SNR graph and can for example increase the SNR in transition regions. This can in turn reduce the visibility of stitching artifacts in the merged image, improving the image quality of the merged image.

Figure 6B:
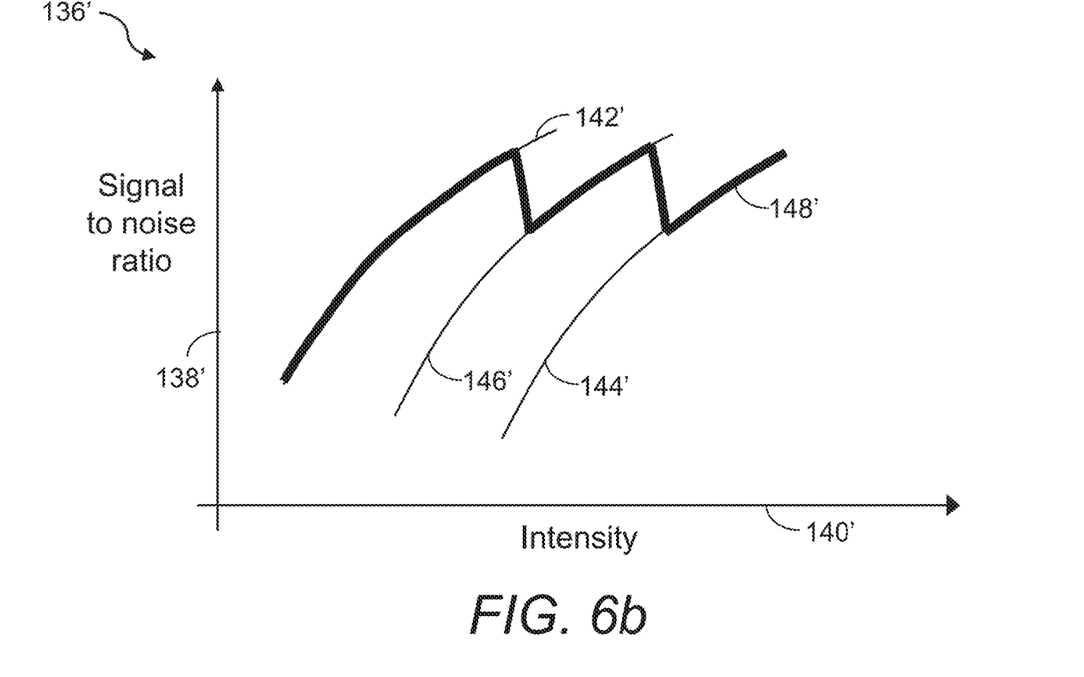

FIG. 6b shows a graph 136' of SNR for the same image sensor as that of FIG. 6a. Features of FIG. 6b similar to corresponding features of FIG. 6a are labelled with the same reference numeral but appended with an apostrophe. The graphs 136, 136' in FIGS. 6a and 6b are the same, except that the graph 136' of FIG. 6b is captured with a different exposure ratio (in this example, the ratio between the first exposure 142' and the second exposure 144') than the graph 136 of FIG. 6a. In FIG. 6a, the exposure ratio of the first exposure 142 to the second exposure 144 is 256:1. In other words, the first exposure 142 is 256 times longer than the second exposure 144 in FIG. 6a. In contrast, the exposure ratio of the first exposure 142' to the second exposure 144' is 64:1 in FIG. 6b. In other words, the first exposure 142' is 64 times longer than the second exposure 144'. Thus, in FIG. 6b, the exposure ratio has been reduced compared to FIG. 6a.

The scales of the graphs 136, 136' of FIGS. 6a and 6b are the same. It can therefore be seen that the variation of the SNR of the graph 136' of FIG. 6b is reduced compared with that of the graph 136 of FIG. 6a. Thus, the minimum SNR is larger for a larger range of pixel intensity values with the graph 136' of FIG. 6b than that of FIG. 6a. Accordingly, if the exposure ratio is changed to obtain a merged image with the SNR corresponding to FIG. 6b, the scene may be captured with a larger dynamic range, with reduced motion artifacts and with lower noise in the transition regions than with the exposure ratio corresponding to FIG. 6a.

The SNR for pixels captured with the first exposure (which may be considered to be a long exposure) can be estimated from the SNR obtained using data from pixels captured with the second exposure (which may be considered to be a short exposure). For example, the SNR obtained using the noise profile of the image sensor with the second exposure can be processed with an exposure ratio factor (such as the exposure ratio itself), which is for example the first exposure divided by the second exposure, to obtain an estimate of the $SNR_L$ (i.e. the estimated SNR for the pixels captured using the first exposure) using the following equation:

$$SNR_L = \frac{x * ER_L}{\sigma(x * ER_L)} \quad (8)$$

Where the noise profile of the image sensor is as given in equation (2), this may be approximated as:

$$SNR_L = \sqrt{cx * ER_L} \quad (9)$$

Similarly, an estimated weighted SNR for the pixels captured using the first exposure, $WSNR_L$, may be calculated as:

$$WSNR_L = \sum_{x=0}^{N} \frac{xH(x) * ER_L}{\sigma(x * ER_L)} \quad (10)$$

As for the $SNR_L$, the $WSNR_L$ may be approximated using the following equation where the noise profile of the image sensor is as given in equation (2):

$$WSNR_L = \sum_{x=0}^{N} H(x) \sqrt{\left(\frac{x}{c}\right) * ER_L} \quad (11)$$

where the sums over N in equations (10) and (11) are a sum over the pixels of the image.

Typically, though, not all the pixels of the image are captured using the first exposure when exposure fusion is used. In general, the merged image includes contributions from both the first image (captured with the first exposure) and the second image (captured with the second image). Thus, in examples, the sum in equation (11) may be modified such that the sum is over the pixels of the image that are expected or anticipated to contribute to the merged image that are to be captured with the first image. This may correspond to the pixels of the image with an intensity that can be captured with the first exposure without clipping, such as the pixels of the image captured by the image sensor that lie within a predetermined range of intensities. This range of intensities may be determined experimentally.

As explained above, in examples, a multi-exposure image capture system involves combining multiple images obtained using different exposures to obtain a merged image. In examples described herein, the multi-exposure image capture system may be operable to capture a third image of a scene with a third exposure longer than the second exposure and shorter than the first exposure. In such cases, the exposure ratio may be a first exposure ratio and the method may include setting a second exposure ratio which corresponds to a ratio of the third exposure to the second exposure. For example, the second exposure ratio may be set in dependence on the first exposure ratio.

In multi-exposure image capture systems such as this, the distribution of counts relating to values of the characteristic of respective pixels of an image may be divided into a plurality of regions, each associated with a different respective range of values of the characteristic, such as the first, second and third regions 124, 126, 128 and 124', 126', 128' of FIGS. 4a and 4b. For example, each of the regions may correspond to values of the characteristic that are to be captured using a different respective exposure. Referring to FIGS. 4a and 4b, the first region 124, 124', which corresponds to a low intensity range, may be captured with the first exposure, which is longer than the second and third exposures, to enhance detail in the relatively dark parts of the scene. Similarly, the second region 126, 126', which corresponds to a high intensity range, may be captured with the second exposure, which is shorter than the first and third exposures, to capture detail in the relatively bright parts of the scene that would be overexposed with a longer exposure.

Pixels located in each of the plurality of regions may have a different relative to contribution to the merged image, which may depend not only on the scene to be captured but also on the first and second exposure ratios of the image sensor. For example, a plurality of regional WSNR values of a WSNR function (such as WSNR functions similar to those of equations (5), (6), (7), (10) and (11)) may be calculated, each one of the plurality of regional WSNR values corresponding to a respective region of the plurality of regions and based on the distribution data for pixels within the respective region. The plurality of regional WSNR values may be combined to obtain the output value of an optimization function for determining at least one of the first and second exposure ratios.

For example, the WSNR may be calculated as the sum of the WSNR for the first exposure, $WSNR_L$, the WSNR for the third exposure, $WSNR_M$, and the WSNR for the second exposure, $WSNR_S$, which may be calculated as follows:

$$WSNR_L = \sum_{x=0}^{Nlong} \frac{xH(x)*ER_L}{\sigma(x*ER_L)} \quad (12)$$

$$WSNR_M = \sum_{x=Nlong}^{Nmed} \frac{xH(x)*ER_M}{\sigma(x*ER_M)} \quad (13)$$

$$WSNR_S = \sum_{x=Nmed}^{N} \frac{xH(x)}{\sigma(x)} \quad (14)$$

In these examples, each of these values is obtained by processing an overall WSNR with an exposure ratio factor that depends on the anticipated or estimated contribution of pixels captured with a long, medium and short exposure (for equations (12), (13) and (14) respectively), and subsequently performing a sum over different respective pixel intensity ranges. In equation (12) the exposure ratio factor is equal to $ER_L$, in equation (13) the exposure ratio factor is equal to $ER_M$, and in equation (14) the exposure ratio factor is equal to 1. It is to be appreciated that in other examples, though, the exposure ratio factor to represent estimated contributions from images captured with different respective exposures may be different.

The WSNR for the multi-exposure image capture system, WSNR, may then be calculated as:

$$WSNR = \sum_{x=0}^{Nlong} \frac{xH(x)*ER_L}{\sigma(x*ER_L)} + \sum_{x=Nlong}^{Nmed} \frac{xH(x)*ER_M}{\sigma(x*ER_M)} + \sum_{x=Nmed}^{N} \frac{xH(x)}{\sigma(x)} \quad (15)$$

In examples such as this, the noise profile may be approximated using the function of equation (2). In such cases, the WSNR for the multi-exposure image capture system may be calculated as:

$$WSNR = \sum_{x=0}^{Nlong} H(x)\sqrt{\left(\frac{x}{c}\right)*ER_L} + \sum_{x=Nlong}^{Nmed} H(x)\sqrt{\left(\frac{x}{c}\right)*ER_M} + \sum_{x=Nmed}^{N} H(x)\sqrt{\left(\frac{x}{c}\right)} \quad (16)$$

In equations (12) to (16), Nlong, corresponds to the range of values of the characteristic (for example, the range of pixel intensity values) that may be captured with the first exposure without clipping. Similarly, Nmed, corresponds to the range of values of the characteristic that may be captured with the third exposure without clipping. Thus, the sum between Nmed and N (that is used in equations (14), (15) and (16)) for example corresponds to the range of values above the range corresponding to Nmed. In other words, the sum between Nmed and N is for example a sum over all pixels with an intensity that does not lie in the first and third regions 124, 126.

In examples such as this, at least one of the plurality of regional WSNR values depends on the input exposure ratio input to the optimization function. In this case, the regional WSNR value corresponding to the first region 124, 124' of FIGS. 4a and 4b, $WSNR_L$, depends on the input exposure ratio, which in this example is the first exposure ratio $ER_L$. However, the regional WSNR value corresponding to the third region 126, 126' of FIGS. 4a and 4b, $WSNR_M$, depends on the second exposure ratio $ER_M$. In this example, the dependence of $WSNR_L$ on the input exposure ratio is due to the inclusion of the exposure ratio factor for this values. However, in other examples, the dependence of $WSNR_L$ on the input exposure ratio may be due to other factors or components (& similarly for $WSNR_M$ and $WSNR_S$).

In this case, a two-dimensional optimization may be performed, in which a variety of different values of $ER_L$ and $ER_M$ are input to the WSNR functions (15) or (16) to obtain a plurality of output WSNR values. Values of $ER_L$ and $ER_M$ may then be selected for use as exposure ratios for the multi-exposure ratio system in dependence on the plurality of output WSNR values. For example, the values of $ER_L$ and $ER_M$ corresponding to the maximum output WSNR value may be selected, for example to maximize the WSNR value.

In other examples, a one-dimensional optimization process may be performed, for example where the second exposure ratio may be taken to depend on the first exposure ratio. For example, the second exposure ratio may be set to a value proportional to or equal to a square root of the first exposure ratio. In cases such as this, the equations for the calculation of the WSNR value (such as equations (15) and (16)) may expressed in terms of the first exposure ratio, $ER_L$, and $ER_M$ may be removed from these equations. A plurality of input values of the first exposure ratio may be input to the WSNR function to obtain a plurality of output WSNR values. The value of the first exposure ratio may then be selected, for example as the value of the first exposure ratio that maximizes the WSNR value or for which the WSNR value meets or exceeds a threshold WSNR value.

In optimization processes such as this, the constant c may be omitted from WSNR functions such as that of equation (16) as the value of c typically does not affect or alter the outcome of the optimization process.

In further examples, rather than separately calculating the regional WSNR values for each of the plurality of regions, a cumulative WSNR value may instead be calculated and processed using a respective regional factor. The regional factor may for example correspond to an exposure ratio function, which is dependent on the input exposure ratio, for example as described above. For example, what may be considered to be a two-pass method may be used to determine the exposure ratio to be used with the multi-exposure image capture system. Firstly, a WSNR value for a single exposure may be calculated. Subsequently, the calculation of the WSNR value may be performed by dividing the distribution of counts into the plurality of regions, as described above, with each of the plurality of regions associated with a respective regional factor. A plurality of regional WSNR values, each corresponding to the WSNR value processed with a respective one of the regional factors, may then be obtained. The plurality of regional WSNR values may be combined to obtain the output value of the optimization function.

For example, the WSNR value for the image may be calculated using equation (5), (6) or (7) and referred to as a cumulative WSNR (WSC). The regional factors may be representative of a contribution of images captured with a given exposure to the merged image (which typically depends on the scene captured in the image). For example, the WSNR for the first exposure, $WSNR_L$, the WSNR for the third exposure, $WSNR_M$, and the WSNR for the second exposure, $WSNR_S$, may be calculated as follows:

$$WSNR_L = WSC\left(\frac{N}{ER_L}\right)\sqrt{ER_L} \quad (17)$$

$$WSNR_M = \left[WSC\left(\frac{N}{ER_M}\right) - WSC\left(\frac{N}{ER_L}\right)\right]\sqrt{ER_M} \quad (18)$$

$$WSNR_S = WSC(N) - WSC\left(\frac{N}{ER_M}\right) \quad (19)$$

These values may be summed to calculate the WSNR for the multi-exposure image capture system, as:

$$WSNR = \quad (20)$$
$$WSC\left(\frac{N}{ER_L}\right)\sqrt{ER_L} + \left[WSC\left(\frac{N}{ER_M}\right) - WSC\left(\frac{N}{ER_L}\right)\right]\sqrt{ER_M} +$$
$$WSC(N) - WSC\left(\frac{N}{ER_M}\right)$$

In equations (17) to (20), N is the number of pixels in the image from which the WSNR is calculated and the other parameters are as defined above. This method is therefore similar to the method summarized in equations (15) and (16) however, in equations (15) and (16), a separate sum is performed over the pixels corresponding to each respective region to calculate the regional WSNR values. In contrast, with equation (20), a sum is performed over all pixels of the image to obtain the cumulative WSNR value and the regional WSNR values are obtained by processing the cumulative WSNR value with a respective one of the regional factors.

Equation (20) may be evaluated efficiently in hardware as it includes no iterations over histograms and merely two multiplications and two divisions. As explained above with reference to equations (15) and (16), a two-dimensional optimization may be performed to separately iterate over both $ER_L$ and $ER_M$ using equation (20). Conversely, a one-dimensional optimization may be performed to iterate over only one of $ER_L$ and $ER_M$. For example, $ER_M$ may expressed as a function of $ER_L$. For example, if $ER_M = \sqrt{ER_L}$, the value of WSNR may be obtained straightforwardly from equation (20) using various different input values of $ER_L$.

Figure 7:
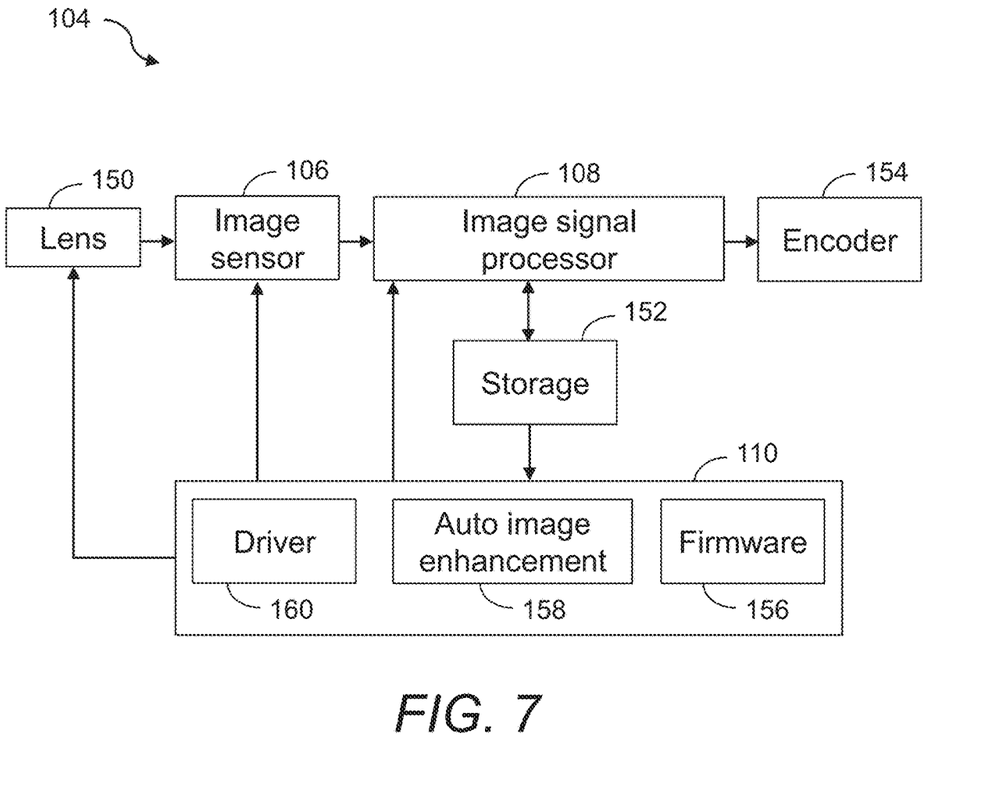
FIG. 7 illustrates schematically the multi-exposure image capture system of FIG. 2 in further detail.

FIG. 7 illustrates schematically the multi-exposure image capture system 104 of FIG. 2 in further detail. Features of FIG. 2 that are also illustrated in FIG. 7 are labelled with the same reference numerals; corresponding descriptions are to be taken to apply.

The multi-exposure image capture system 104 of FIG. 7 includes a lens 150 and an image sensor 106. The image sensor 106 for example includes a plurality of sensor pixels. An exposure of the sensor pixels of the image sensor 106 are typically adjustable. The exposure generally depends on a combination of a shutter speed of the multi-exposure image capture system 104 (and hence the time the image sensor 106 is exposed to light, sometimes referred to as the exposure time) and characteristics of the multi-exposure image capture system 104, such as the size of the aperture (or iris) of the lens 150, which controls the amount of light incident on the image sensor 106. For example, these characteristics may be represented by an f-number of the multi-exposure image capture system 104, sometimes referred to as the focal ratio, f-ratio or f-stop. The f-number for example represents the ratio of the focal length of the lens 150 to the diameter of the entrance to the lens 150. Where the characteristics of the multi-exposure image capture system 104, such as the f-number of the lens 150, remain constant or unchanged, the exposure may therefore be proportional to the exposure time. Accordingly, references herein to a difference in exposure may also indicate a difference in exposure time.

Light is received at the image sensor 106 of the multi-exposure image capture system 104 via the lens 150 and is converted to image data. The image data is transferred to the image signal processor 108, which is typically configured to generate output image data representative of at least part of an output image. The output image data may be encoded via an encoder 154 before being transferred to other components (not shown in FIG. 7), for example for storage or further processing. The image signal processor 108 typically includes a number of modules or units that are configured to perform various processing on the image data, to generate the output image data. Image signal processors such as the image signal processor 108 of FIG. 7 may include a microprocessor, a general purpose processor, a digital signal processor (DSP), an application specific integrated circuit (ASIC), a field programmable gate array (FPGA) or other programmable logic device, a discrete gate or transistor logic, discrete hardware components, or any suitable combination thereof designed to perform the functions described herein. A processor may also be implemented as a combination of computing devices, e.g., a combination of a DSP and a microprocessor, a plurality of microprocessors, one or more microprocessors in conjunction with a DSP core, or any other such configuration.

The image signal processor 108 in the example of FIG. 7 generates a distribution of counts relating to values of a characteristic of respective pixels of the image represented by the image data, for example as described above. For example, the image signal processor 108 may be configured to process the image data to generate a histogram of a distribution of counts relating to pixel intensity values. The distribution (for example in the form of a histogram) may be stored in storage 152 of the multi-exposure image capture system 104. The storage 152 may include at least one of volatile memory, such as a Random Access Memory (RAM) and non-volatile memory, such as Read Only Memory (ROM) or a solid state drive (SSD) such as Flash memory. The storage 152 is for example an on-chip memory or buffer that may be accessed relatively rapidly by the image signal processor 108 or the exposure controller 110. In other examples, though, the storage 152 may include further storage devices, for example magnetic, optical or tape media, compact disc (CD), digital versatile disc (DVD) or other data storage media. The storage 152 may be removable or non-removable from the multi-exposure image capture system 104. The storage 152 in FIG. 7 is communicatively coupled to the image signal processor 108 so that data can be transferred between the storage 152 and the image signal processor 108.

The multi-exposure image capture system 104 of FIG. 7 also includes an exposure controller 110 for controlling features or characteristics of the lens 150 and/or the image sensor 106. The exposure controller 110 may include hardware or software components or a combination of hardware and software. In FIG. 7, the exposure controller 110 includes firmware 156 which includes software for controlling the operation of the exposure controller 110, for example to implement the methods of determining an exposure ratio of a multi-exposure image capture system as described herein. The firmware 156 may be stored in non-volatile memory of the exposure controller 110 or in the storage 152 (which is accessible to the exposure controller 110). The exposure controller 110 of FIG. 7 also includes an auto image enhancement module 158, which for example is configured to perform processing to determine whether adjustments need to be made to the system 104 to improve the image quality. For example, the auto image enhancement module 158 may include an auto exposure module, an auto white balance module and/or an auto focus module.

The exposure controller 110 also includes a driver 160 for controlling the operation of the lens 150 and/or the image sensor 106. For example, if it is determined that the exposure ratio of the multi-exposure image capture system 104 is to be altered, the driver 160 will instruct the lens 150 and/or the image sensor 106 to change appropriately to obtain the desired exposure ratio, for example by changing the shutter speed and/or the f-number. In further examples, the driver 160 may instead instruct the image signal processor 108 to instruct adjustments in the lens 150 and/or image sensor 106 rather than directly instructing the lens 150 and/or image sensor 106. Typically, the driver 160 is configured to, based on the instructions of the firmware 156, read the distribution from the storage 152 and perform the exposure ratio determination. The storage 152 may also include the weighting function. In such examples, the driver 160 may read the weighting function from the storage 152. In other examples, though, the weighting function may be stored in other storage, such as on-chip storage of the exposure controller and retrieved from there instead.

In further examples, the exposure ratio determination may be performed by other components or modules of a multi-exposure image capture system such as that of FIG. 7, rather than the driver 160. As described above, in alternative examples, the image signal processor and the exposure controller may be combined or the image signal processor may perform some or all of the functions that the exposure controller 110 of FIG. 7 is configured to perform (or vice versa).

The above examples are to be understood as illustrative examples. Further examples are envisaged. FIG. 5 illustrates an example in which a weighting function for use in determining an exposure ratio generally corresponds to a noise profile an image sensor. However, in other examples, the weighting function may have a different dependence on the value of the characteristic. For example, the weighting function may generally correspond to a noise profile of an image sensor for a subset of values of the characteristic or may have a profile that is similar to that of the noise profile of the image sensor with some deviations that are nevertheless significant that the weighting function may not be considered to generally correspond to the noise profile of the image. In yet further examples, the weighting function may provide a representation of a different component that reduces the signal obtainable by the image sensor. Alternatively, the weighting function may be a polynomial function of the value of the characteristic. Furthermore, although examples described above refer to a noise model or noise profile, in other examples, the weighting function may instead represent a photon transfer curve, which for example represents a measured noise of a particular image sensor. The weighting function may also or instead include a transform function element that represents non-linearity in the image sensor, for example non-linear behavior of the image sensor in response to a linear increase in pixel intensity.

Equations for calculating a noise profile, a SNR value and a WSNR value are given above. However, it is to be understood that these are merely illustrative equations and other equations may be used to evaluate these values in other examples.

In examples described above, the multi-exposure image capture system is operable to capture two images of a scene with two different exposures or three images of a scene with three different exposures and then combine the two or three different images to generate a merged image. It is to be appreciated that in other examples multi-exposure image capture systems or methods similar to those described herein may be arranged to capture a larger number of images with different images, such as four images with four different exposures.

It is to be understood that any feature described in relation to any one example may be used alone, or in combination with other features described, and may also be used in combination with one or more features of any other of the examples, or any combination of any other of the examples. Furthermore, equivalents and modifications not described above may also be employed without departing from the scope of the accompanying claims.

The invention claimed is:

1. A method of determining an exposure ratio for use with a multi-exposure image capture system operable to capture a first image of a scene with a first exposure and a second image of the scene with a second exposure shorter than the first exposure, the exposure ratio being a ratio of the first exposure to the second exposure, the method comprising:

obtaining image data representative of an image captured using an image sensor of the image capture system;

inputting distribution data derived from a distribution of counts relating to values of a characteristic of respective pixels of the image to an optimization function, each of a plurality of output values of the optimization function dependent on a respective one of a plurality of input exposure ratios input to the optimization function, wherein the optimization function is based on a weighting function which varies with the values of the characteristic; and setting the exposure ratio by selecting the exposure ratio from the plurality of input exposure ratios based on the plurality of output values of the optimization function.

2. The method according to claim 1, wherein the weighting function corresponds to a noise profile of the image sensor.

3. The method according to claim 1, wherein the weighting function is approximately proportional to a square root of the value of the characteristic.

4. The method according to claim 1, comprising selecting the exposure ratio from the plurality of plurality of input exposure ratios that corresponds to an optimum output value of the plurality of output values.

5. The method according to claim 1, wherein the optimization function comprises a weighted signal to noise ratio (WSNR) function.

6. The method according to claim 5, wherein the WSNR function comprises a logarithmic function.

7. The method according to claim 5, comprising:
calculating a WSNR value for the image using the WSNR function; and
processing the WSNR value with an exposure ratio factor dependent on the input exposure ratio to obtain the output value of the optimization function.

8. The method according to claim 5, comprising:
dividing the distribution of counts into a plurality of regions, each of the plurality of regions associated with a different respective range of values of the characteristic;
calculating a plurality of regional WSNR values of the WSNR function, each one of the plurality of regional WSNR values corresponding to a respective region of the plurality of regions and based on the distribution data for pixels within the respective region; and
combining the plurality of regional WSNR values to obtain the output value.

9. The method according to claim 8, wherein at least one of the plurality of regional WSNR values depends on the input exposure ratio.

10. The method according to claim 5, comprising:
calculating a WSNR value for the image using the WSNR function;
dividing the distribution of counts into a plurality of regions, each of the plurality of regions associated with a respective regional factor and a different respective range of values of the characteristic;
obtaining a plurality of regional WSNR values each corresponding to the WSNR value processed with a respective one of the regional factors; and
combining the plurality of regional WSNR values to obtain the output value of the optimization function.

11. The method according to claim 1, wherein:
the exposure ratio is a first exposure ratio;

the multi-exposure image capture system is operable to capture a third image of a scene with a third exposure longer than the second exposure and shorter than the first exposure; and the method comprises setting a second exposure ratio of the third exposure to the second exposure in dependence on the first exposure ratio.

12. The method according to claim 11, comprising setting the second exposure ratio to a value proportional to a square root of the first exposure ratio.

13. The method according to claim 1, wherein the characteristic is a pixel intensity of the respective pixels of the image.

14. The method according to claim 1, wherein the image is captured using the image sensor with the second exposure.

15. An exposure controller for controlling an exposure ratio for use with a multi-exposure image capture system operable to capture a first image of a scene with a first exposure and a second image of the scene with a second exposure shorter than the first exposure, the exposure ratio being a ratio of the first exposure to the second exposure, the exposure controller operable to:

obtain image data representative of an image captured using an image sensor of the image capture system;

input distribution data derived from the distribution of counts relating to values of a characteristic of respective pixels of the image to an optimization function, an output value of the optimization function dependent on an input exposure ratio input to the optimization function, wherein the optimization function is based on a weighting function which varies with the values of the characteristic and the optimization function comprises a weighted signal to noise ratio (WSNR) function; and set the exposure ratio in dependence on the output value.

16. The exposure controller according to claim 15, wherein the weighting function corresponds to a noise profile of the image sensor.

17. The exposure controller according to claim 15, wherein the exposure controller is configured to:
calculate a WSNR value for the image using the WSNR function; and
process the WSNR value with an exposure ratio factor dependent on the input exposure ratio to obtain the output value of the optimization function.

18. The exposure controller according to claim 15, wherein the exposure controller is configured to:
divide the distribution of counts into a plurality of regions, each of the plurality of regions associated with a different respective range of values of the characteristic;
calculate a plurality of regional WSNR values of the WSNR function, each one of the plurality of regional WSNR values corresponding to a respective region of the plurality of regions and based on the distribution data for pixels within the respective region; and
combine the plurality of regional WSNR values to obtain the output value.

19. A method of determining an exposure ratio for use with a multi-exposure image capture system operable to capture a first image of a scene with a first exposure and a second image of the scene with a second exposure shorter than the first exposure, the exposure ratio being a ratio of the first exposure to the second exposure, the method comprising:

obtaining image data representative of an image captured using an image sensor of the image capture system; and setting the exposure ratio in dependence on a distribution of counts relating to values of a characteristic of respective pixels of the image and a weighting function which varies with the values of the characteristic, wherein:

the exposure ratio is a first exposure ratio;

the multi-exposure image capture system is operable to capture a third image of a scene with a third exposure longer than the second exposure and shorter than the first exposure; and the method comprises setting a second exposure ratio of the third exposure to the second exposure in dependence on the first exposure ratio.

20. The method according to claim 19, comprising setting the second exposure ratio to a value proportional to a square root of the first exposure ratio.

* * * * *